United States Patent [19]

Morioka

[11] Patent Number: 4,571,789

[45] Date of Patent: Feb. 25, 1986

[54] SNAP FASTENER FOR BELT DRIVEN CARTRIDGE

[75] Inventor: Eddie T. Morioka, Roseville, Minn.

[73] Assignee: Minnesota Mining and Manufacturing Company, St. Paul, Minn.

[21] Appl. No.: 627,355

[22] Filed: Jul. 3, 1984

[51] Int. Cl.$^4$ .................. F16B 21/06; G03B 1/04
[52] U.S. Cl. .................................. 24/625; 24/295; 24/297; 242/192
[58] Field of Search ............ 24/625, 629, 615, 588, 24/292, 295, 297; 242/192

[56] References Cited

U.S. PATENT DOCUMENTS

| | | | |
|---|---|---|---|
| 2,099,655 | 11/1937 | MacFadden | 24/625 |
| 2,745,620 | 5/1956 | Murphy | 24/297 |
| 3,037,596 | 6/1962 | Fordyce | 24/297 |
| 3,120,971 | 2/1964 | Bengtsson | 24/625 |
| 3,153,975 | 10/1964 | Rapata | 24/295 |
| 3,493,990 | 2/1970 | Winn | 24/625 |
| 3,692,255 | 9/1972 | Von Behren | 242/192 |
| 4,012,155 | 3/1977 | Morris | 24/625 |
| 4,457,473 | 7/1984 | Mroz et al. | 242/192 |

FOREIGN PATENT DOCUMENTS

| | | | |
|---|---|---|---|
| 1111742 | 3/1956 | France | 24/625 |
| 745788 | 2/1956 | United Kingdom | 24/297 |

Primary Examiner—Victor N. Sakran
Attorney, Agent, or Firm—Donald M. Sell; James A. Smith; David W. Anderson

[57] ABSTRACT

A data cartridge includes snap fasteners which extend between parallel walls of the cartridge and which are bifurcated to produce two parallel spring arms which may be compressed for insertion into a hole provided in one of the walls. The spring arms include enlarged heads, which are adapted to pass through the wall adjacent the hole when the spring arms are compressed, and reduced necks which allow expansion of the spring arms and gripping of the wall by the enlarged heads.

3 Claims, 7 Drawing Figures

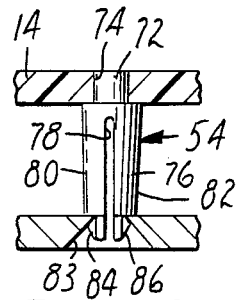
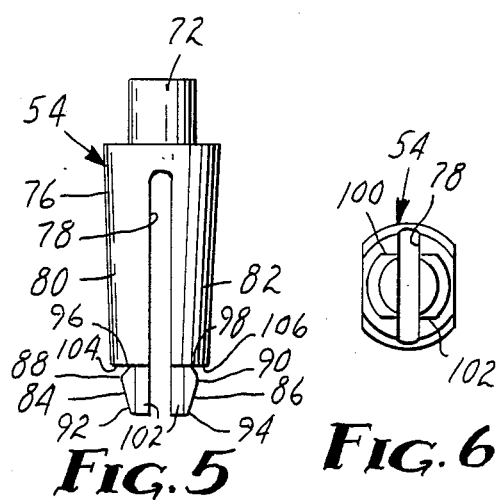
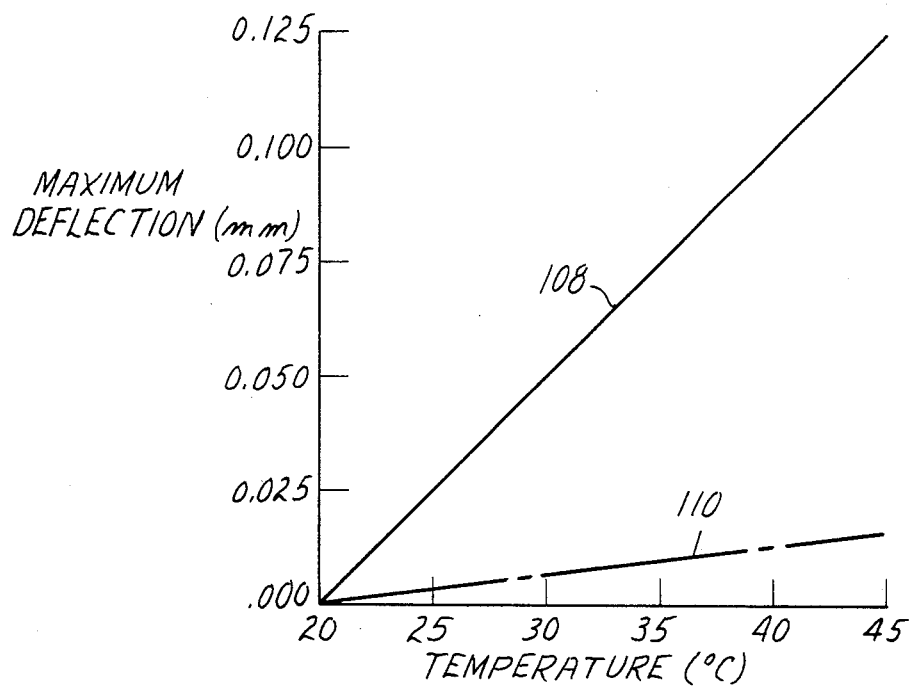

4,571,789

SNAP FASTENER FOR BELT DRIVEN CARTRIDGE

BACKGROUND OF THE INVENTION

1. Field of the Invention

The present invention concerns an improved fastener for connecting two walls defining an enclosure for a two-spool tape cartridge in which a flexible, elastic drive belt contacts the tape on the tape spools and whereby movement of the belt causes movement of the tape between the spools.

2. Description of the Prior Art

The belt driven cartridge of U.S. Pat. No. 3,692,255, issued to Von Behren and assigned to the assignee of the present invention, has been very successfully utilized to interface with computers where rapid acceleration and deceleration of the tape are required. In the cartridge there disclosed, a magnetic recording tape is convolutely wound on two tape spools and is bidirectionally driven between the spools by an endless flexible belt in frictional contact with the tape on both spools. The cartridge itself includes a thin base plate, usually of aluminum, and a clear or translucent polymeric cover which is conventionally attached to the plate with screws to define a thin, generally rectangular enclosure.

When the cartridge of the Von Behren patent was first marketed in 1972, its magnetic recording tape had a width of ¼ inch (6.35 mm), a thickness of 1 mil (0.025 mm), and was driven at 30 inches (762 mm) per second. Data were originally recorded on the tape at a density of 1600 flux reversals per inch (63 per mm). Current cartridges come in a variety of sizes and the recording tapes range in width from 0.150 inches (3.81 mm) to 0.250 inches (6.35 mm), may be as thin as 0.6 mil (0.015 mm), may be driven at 90 or more inches (2286 mm) per second, and data is recorded at densities of 10,000 flux reversals per inch (394 per mm) or more. In addition, data are recorded on a plurality of independent, parallel tracks, which may number in excess of 32, spaced across the width of the magnetic recording tape.

It has been discovered that the differential thermal coefficients of expansion and the inflexible screw fastening between the polymeric cover and the aluminum plate causes the cartridge to bow to a maximum deflection at its center of approximately 0.005 inches (0.125 mm) over the temperature range which may be encountered during operation. Although this deflection did not cause a problem when the cartridge was first introduced, the higher tape speeds, recording densities, and track densities have created a need for a more stable cartridge which remains flat when exposed to temperature extremes.

SUMMARY OF THE INVENTION

The present invention discloses a snap fastener which connects the cover and plate defining the cartridge enclosure while allowing the plate and cover to expand at different rates without greatly deforming the cartridge.

In particular, the snap fastener of the present invention is adapted to releasably secure a surface to a parallel wall defining a hole therethrough and includes a solid body portion attached to the surface, a bifurcation defined by a slot, and two spring arms extending from the bifurcation toward the wall and the hole, which spring arms are capable of resilient deflection toward each other within the slot and are substantially perpendicular to the surface and the wall when undeflected. The arms terminate in enlarged heads for insertion through the hole, which heads have a dimension parallel to the slot which is equal to or less than the hole, a combined dimension transverse to the slot when the arms are undeflected which is greater than the dimension of the hole and a combined dimension less than that of the hole when the arms are deflected toward each other. Adjacent the enlarged heads are reduced neck portions on each spring arm which have a dimension parallel to the slot which is less than or equal to the dimension of the hole to allow insertion of the neck portions into the hole and a combined dimension transverse to the slot which is substantially equal to the dimension of the hole when the spring arms are undeflected. Contact between the enlarged heads and the hole causes deflection of the spring arms toward each other which allows passage of the heads through the hole and passage of the head through the hole permits the resilient return of the spring arms to the undeflected position and contact between the neck portions and the hole whereby the snap fitting is retained in the hole by expansion of the enlarged heads to a dimension greater than the hole.

The snap fastener may also include an enlarged shoulder adjacent the neck portion which limits the insertion of the snap fastener into the hole.

BRIEF DESCRIPTION OF THE DRAWINGS

The present invention will be more thoroughly described with reference to the accompanying drawings, wherein like numbers refer to like parts in the several views, and wherein:

FIG. 4 is an enlarged, cross-sectional view of a portion of the data cartridge of FIG. 1 taken generally along the line 4—4 of FIG. 1;

FIG. 5 is an enlarged, side view of a snap fastener according to the present invention;

FIG. 6 is an enlarged, end view of the snap fastener of FIG. 5; and

FIG. 7 is a graphical representation of deflection of the data cartridge of FIGS. 1 and 4–6 verses temperature.

DESCRIPTION OF THE PREFERRED EMBODIMENTS

Figure 1:
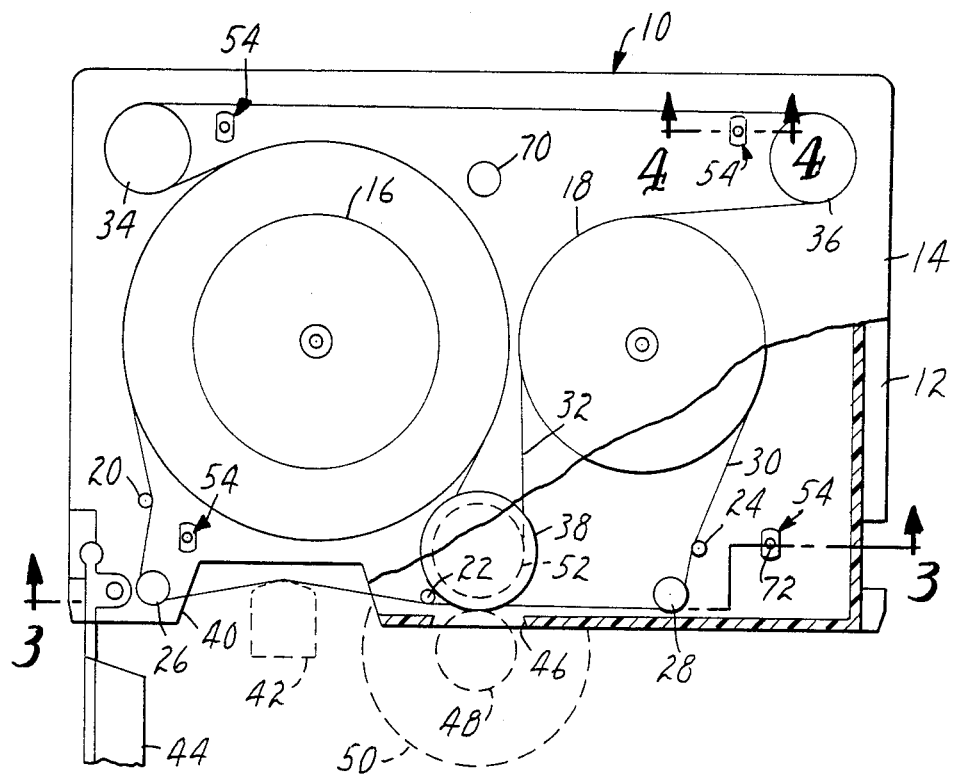
FIG. 1 is a top plan view of a belt driven tape cartridge, partially in section, containing snap fasteners of the present invention.

FIG. 1 illustrate a data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving roller 38.

The tape spools 16 and 18 are supported by the cartridge base plate 12 for free rotation about spaced parallel axes. The magnetic recording tape 30 is convolutely wound on the tape spools 16 and 18 in opposite directions about their axes. The tape 30 guide path between the tape spools 16 and 18 is defined by the three tape wrap pins 20, 22 and 24 and the two tape guides 26 and 28.

The cartridge 10 is formed with a cutaway portion 40 along the tape path which provides access to the magnetic tape 30 by a magnetic transducer 42. The cutaway portion 40 is normally closed by a spring-loaded door 44 which is opened as shown upon insertion of the data cartridge 10 into a tape recorder (not shown). A second opening 46 is provided in the cartridge cover 14 to provide access to the belt driving roller 38 by a drive roller 48 driven by a reversible motor 50. The magnetic transducer 42, the drive roller 48, and the reversible motor 50 are illustrated in phantom lines as they form a portion of the tape recorder rather than the data cartridge 10.

The cartridge belt driving roller 38 is provided with a reduced diameter 52 to prevent contact between the driving belt 32 and the magnetic recording tape 30. The driving belt 32 is thin, continuous, flexible and elastic. It has a uniform cross-sectional area and it extends around the belt driving roller 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving roller 38 in a counterclockwise direction (as viewed in FIG. 1) by the drive roller 48 causes the belt 32 to traverse its path in a counterclockwise direction and the tape 30 to move from the tape spool 18 to the tape spool 16, the tape spool 18 serving as a supply spool and the tape spool 16 serving as a take-up spool. Opposite rotation of the driving roller 38 by the drive roller 48 will cause tape to be supplied by the tape spool 16 and convolutely wound upon the tape spool 18. A predetermined frictional coupling between the belt guide rollers 34 and 36 and their respective support shafts applies a predetermined drag to the belt 32 as its passes around the guide rollers 34 and 36, thereby increasing the tension of the belt 32 as it passes around each of the guide rollers 34 and 36. This increased tension in the belt 32 increases the length of the belt 32 according to its elasticity and thereby the speed at which the belt 32 passes around the spool 18 is increased compared to that at which it passes around the spool 16. This increased speed causes tension in the tape 30 as well as the ability to take up any slack developed in the tape 30 between the tape spools 16 and 18 as is more fully taught in U.S. Pat. No. 3,692,255.

Figure 2:
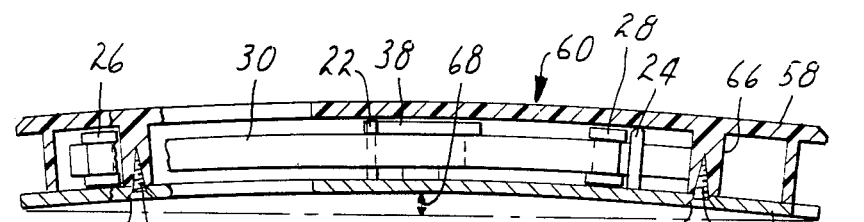
FIG. 2 is a cross-sectional view of a prior tape cartridge taken generally along a line which corresponds to the line 3—3 of FIG. 1.

The cartridge plate 12 and the cartridge cover 14 are connected according to the present invention by snap fasteners 54 located adjacent the four corners of the cartridge 10. FIG. 2 illustrates the prior method of attaching a cartridge plate 56 and a cartridge cover 58 to form a thin, rectangular enclosure defining a cartridge 60 which, other than the method of fastening, is identical in all respects to the cartridge 10 of FIG. 1.

In the prior cartridge 60, the cartridge plate 56 was attached to the cartridge cover 58 by means of screws 62 which extended through a countersunk hole 64 in the cartridge plate 56 to engage a boss 66 molded as an integral part of the cartridge cover 58. It has been found that the inflexible connection, consisting of the screws 62 and the integral boss 66, between the cartridge plate 56 and the cartridge cover 58 does not allow the cartridge plate 56 and cover 58 to move relative to each other during temperature changes and causes the prior cartridge 60 to bow from end to end as illustrated by the double arrow 68. This bowing 68 is caused by differential expansion between the polymeric material of the cartridge cover 58 and the cartridge plate 56. The deflection 68 measured at the center of the cartridge 60 relative to its sides has been found to be approximately 0.0002 inches (0.005 mm) per degree centigrade. This deflection rate results in a total deflection 68 of approximately 0.005 inches (0.125 mm) over the operating temperature range of 20 to 45 degrees centigrade (68–113 degrees Fahrenheit). Although this deflection seems small in absolute terms, present technology allows at least 32 independent longitudinal tracks to be recorded on the ¼ inch (6.35 mm) wide magnetic tape 30 and even a deflection of 0.005 (0.125 mm) may cause alignment problems between the magnetic transducer 42 and the individual tracks recorded on the tape 30.

To overcome this deflection 68 caused by differential temperature expansion, the screws 62 and bosses 66 of the prior cartridge 60 have been replaced by the snap fasteners 54 which, as shown in FIG. 1, are located adjacent each corner of the cartridge 10. Since the snap fasteners 54 are releasable fasteners, the cartridge 10 retains one screw and boss combination 70 located along the midline of the cartridge 10. This particular positioning of the single remaining screw and boss does not permit the resulting rigid fastening to contribute to deflection of the cartridge 10.

Figure 3:
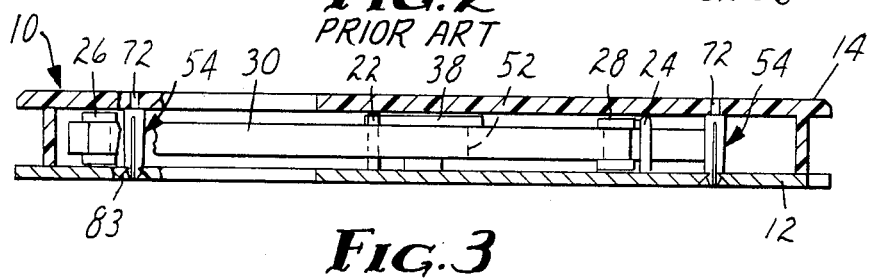
FIG. 3 is a cross-sectional view of the tape cartridge of FIG. 1 taken generally along the line 3—3 of FIG. 1.

FIGS. 3, 4 and 5 illustrates the snap fastener 54 in successive enlargements. The snap fastener 54 may be integrally molded with the cover 14 or may include a stud 72 which is adapted to seat within a hole 74 formed in the cartridge cover 14 and which is secured thereto by an adhesive or welding. Attached to the stud 72 is a solid body portion 76 which is generally circular. The snap fastener 54 is bifurcated by a slot 78 which produces two spring arms 80 and 82 which extend nearly the full length of the snap fastener 54 and which are substantially perpendicular to the planes of the cartridge plate 12 and cover 14. The slot 78 and the length of the spring arms 80 and 82 allow the spring arms 80 and 82 to resiliently deflect toward each other within the slot 78.

The fact that the spring arms 80 and 82 may resiliently deflect results in two advantages. First, resilient deflection of the arms 80 and 82 absorbs most of the differential expansion between the cartridge plate 12 and the cartridge cover 14 and, therefore, allows the plate 12 and the cover 14 to expand at different rates in response to temperature changes without causing the detrimental distortion illustrated in FIG. 2. Second, the resilient deflection of the spring arms 80 and 82 allows the spring arms 80 and 82 to be deflected toward each other within the slot 78, and so permits the ends of the spring arms 80 and 82 to be used as a fastener, as will be described below.

The snap fasteners 54 are designed to be used with the existing countersunk holes 83 in the cartridge plate 12 which provide tapered holes extending through the plate 12. Thus existing cartridges 10 need only be modified by removing the bosses 66 and drilling the holes 74 for attachment of the snap fastener stud 72 to the cartridge cover 14.

As best illustrated in FIGS. 5 and 6, the ends of the spring arms 80 and 82 are provided with enlarged heads 84 and 86 which expand from the terminal end of the spring arms 80 and 82 to points of maximum expansion 88 and 90. The combined dimension of these points of maximum expansion 88 and 90 transverse to the plane of the slot 78, and when the spring arms 80 and 82 are undeflected, is designed to be greater than the least diameter of the countersunk hole 83 so that the enlarged heads 84 and 86 may expand within the countersunk hole 83 and grasp the cartridge plate 12.

As indicated above, the enlarged heads 84 and 86 include tapers 92 and 94 which reduce the combined transverse dimension of the enlarged heads 84 and 86 from the maximum expansion 88 and 90 toward the ends of the spring arms 80 and 82. These tapers 92 and 94 reduce the combined transverse dimension of the enlarged heads 84 and 86 to a dimension which is less than the least diameter of the countersunk hole 83, when the spring arms 80 and 82 are undeflected. The tapers 92 and 94, therefore, allow the cartridge cover 14 to be assembled to the cartridge plate 12 by simply pushing the two pieces together. Contact between the tapers 92 and 94 and the hole 83 will cause the enlarged heads 84 and 86 to be cammed inwardly and thus deflect the spring arms 80 and 82 toward each other and within the slot 78 so that the enlarged heads 84 and 86 may pass through the hole 83.

The spring arms 80 and 82 are provided with reduced neck portions 96 and 98 which allow the spring arms 80 and 82 to expand away from each other after the enlarged heads 84 and 86 have passed the least diameter of the countersunk hole 83. The combined dimension of the reduced necks 96 and 98 in a direction transverse to the plane of the slot 78, and when the spring arms 80 and 82 are undeflected, is substantially equal to the least diameter of the countersunk hole 83, and thus allows the spring arms 80 and 82 to expand completely to their undeflected condition. This complete expansion of the spring arms 80 and 82 allows the enlarged head 84 and 86 to fully contact and seat within the countersunk hole 83. It will be seen in FIG. 5 that the enlarged heads 84 and 86 taper from the points of maximum expansion 88 and 90 to the reduced necks 96 and 98 with a slope that conforms to the angle of the countersunk hole 83 so that maximum contact between the enlarged heads 84 and 86 and the hole 83 is achieved.

FIG. 6 illustrates that the enlarged heads 84 and 86 are formed with flat sides 100 and 102 which have a dimension parallel to the slot 78 which is less than the least diameter of the countersunk hole 83. The flats 100 and 102 are necessary because the enlarged heads 84 and 86 cannot be compressed parallel to the slot 78 as they can be transverse to the slot 78 upon insertion into the hole 83. The reduced necks 96 and 98 need not be provided with a flat side 100 or 102 because the dimension of the reduced necks 96 and 98 parallel to the slot 78 is equal to or less than the least diameter of the hole 83.

Returning to FIG. 5, the spring arms 80 and 82 may be provided with shoulders 104 and 106 which are considerably larger than all dimensions than the hole 83 and which will, therefore, limit insertion of the spring arms 80 and 82 into the hole 83. The shoulders 104 and 106 are preferred but uould not be necessary if other points of contact between the cartridge cover 14 and the cartridge plate 12 were provided to limit approach of the cover 14 and the plate 12.

FIG. 7 illustrates graphically the results of an example which compared the cartridge deflection 68 occurring in a cartridge 60 which was assembled according to FIG. 2 and a cartridge 10 which was assembled utilizing the snap fasteners 54 of FIGS. 1 and 3-6. In each cartridge 10 or 60 the cartridge plate 12 or 56 was manufactured of aluminum and the countersunk holes 64 or 83 had a least diameter of 0.125 inches (3.18 mm) and a countersink angle of 82 degrees. The cartridge covers 14 and 58 were manufactured of polycarbonate and the bosses 66 of FIG. 2 were integrally molded with the cover 58 of the same material.

The snap fasteners 54 were manufactured of polycarbonate and the stud 72 had a diameter of 0.125 inches (3.18 mm) and a length of 0.100 inches (2.54 mm). The snap fasteners 54 were provided with shoulders 104 and 106 which extended a distance of 0.425 inches (10.80 mm) from the cartridge cover 14. The slot 78 extended completely between the spring arms 80 and 82 and to a depth of 0.375 inches (9.53 mm) from the shoulders 104 and 106. The undeflected dimension of the points of maximum expansion 88 and 90 transverse to the plane of the slot 78 was 0.157 inches (3.99 mm) and the combined diameter of the reduced necks 96 and 98, when the spring arms 80 and 82 were undeflected, was 0.120 inches (3.05 mm), which is equal to the least diameter of the countersunk hole 83. The distance across the flat sides 100 and 102 of the enlarged heads 84 and 86 was likewise equal to the diameter of the hole, 0.120 inches (3.05 mm). The temperature of the cartridges 10 or 60 was increased from 20 degrees centigrade to 45 degrees centigrade (68 to 113 degrees Fahrenheit), and the deflection of the center of the cartridge 10 or 60, as indicated by the arrows 68 of FIG. 2, was measured at successively higher temperatures.

The results are shown on the graph of FIG. 7 by curve 108, which corresponds to the deflection 68 verses temperature of the cartridge 60 of FIG. 2, and curve 110 which corresponds to the maximum deflection 68 verses temperature of the cartridge 10 of FIGS. 1 and 3-6. The curves indicate that the cartridge 60 which was fastened with the screws 62 deflected at a rate of approximately 0.0002 inches (0.005 mm) per degree centigrade to a maximum of approximately 0.005 inches (0.127 mm) at 45 degrees centigrade. The cartridge 10, which included the snap fasteners 54, deflected at a rate of approximately 0.00002 inches (0.0005 mm) per degree centigrade to a maximum deflection of approximately 0.0005 inches (0.0127 mm) at 45 degrees centigrade. The snap fasteners 54 thus decreased the deflection 68 of the cartridge 10 by a factor of ten over the screw 62 and boss 66 connection of the cartridge 60.

While the present invention has been described with respect to only a single embodiment, it is recognized that many modifications will be apparent to those skilled in the art. For example, the cartridge plate 12 could be provided with a constant diameter hole and a counterbore rather than the countersunk hole 82. This would merely require modification of the reduced necks 96 and 98 to a cylindrical shape rather than the tapered shape illustrated. Any such modifications falling within the spirit and scope of the appended claims are intended to be included within the present invention.

I claim:

1. A belt driven magnetic tape cartridge housing, comprising:
    a rigid, one-piece, flat base including two opposed major surfaces and a plurality of walls extending from one major surface to the other to define circular holes having a reduced diameter adjacent said one major surface;
    a resilient cover including a flat top wall having an inner surface spaced from and facing said one major surface of said flat base, two opposed side walls depending from said top wall to contact said one major surface of said base, opposed front and back walls depending from said top wall to contact said one major surface of said base, and a plurality of snap fasteners equal in number to said circular holes and extending from said cover inner surface and adapted to engage said walls defining said circular holes and releasably secure said cover to said base, each of said snap fasteners including:
    a solid body portion attached to said top wall inner surface;
    a bifurcation defined by slot;
    two spring arms extending from said bifurcation toward said one major surface of said base and one of said holes, said spring arms being capable of resilient deflection toward each other within said slot and being substantially perpendicular to said top wall inner surface and said one major surface of said base when undeflected;
    said arms terminating in enlarged heads for insertion through said hole, which heads have a dimension parallel to said slot which is equal to or less than said hole, a combined dimension transverse to said slot when said arms are undeflected which is greater than that of said hole, and a combined dimension transverse to said slot when said arms are deflected toward each other which is less than that of said hole; and
    reduced neck portions on each arm adjacent said heads which have a dimension parallel to said slot which is less than or equal to that of said hole to allow insertion of said neck portions into said hole, and a combined dimension transverse to said slot which is substantially equal to that of said hole when said spring arms are undeflected;
    said spring arms further include shoulders which have a dimension parallel to said slot or a combined dimension transverse to said slot when said spring arms are deflected which is greater than that of said wall defining said hole to limit insertion of said spring arms into said hole;
    wherein contact between said enlarged heads and said hole causes deflection of said spring arms toward each other which allows passage of said heads through said hole and wherein passage of said heads through said hole permits the resilient return of said spring arms to said undeflected position and contact between said neck portions and said hole whereby said snap fastener is retained in said hole by expansion of said enlarged heads to a dimension greater than said hole; and
    wherein the length of said spring arms is sufficient to provide lateral resiliency capable of accommodating differential expansion of said cover relative to said base so that said cover may expand in the plane of said top wall to an unequal extent as compared to expansion of said base in the plane of said base without causing deflection of said cover or said base from their flat configuration.

2. A tape cartridge according to claim 1 wherein said enlarged heads include tapered ends opposite said reduced necks which engage said reduced diameter wall defining said hole and are cammed by said engagement with said reduced diameter toward each other to cause said deflection of said spring arms.

3. A tape cartridge according to claim 2 wherein said wall defines an enlarged counterbore or countersink adjacent said reduced diameter and opposite said one major surface which is sized to accept said enlarged heads so that said heads do not extend beyond the other of said major surfaces.

* * * * *